United States Patent
Brockhaus (10) Patent No.: US 9,285,253 B2
(45) Date of Patent: Mar. 15, 2016

(54) TESTING OF A MEASURING DEVICE ARRANGEMENT, CORRESPONDING MEASURING DEVICE ARRANGEMENT AND TEST ARRANGEMENT

(71) Applicant: KROHNE Messtechnik GmbH, Duisburg (DE)

(72) Inventor: Helmut Brockhaus, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 250 days.

(21) Appl. No.: 13/755,457

(22) Filed: Jan. 31, 2013

(65) Prior Publication Data

US 2013/0205866 A1 Aug. 15, 2013

(30) Foreign Application Priority Data

Feb. 3, 2012 (DE) .......... 10 2012 002 013

(51) Int. Cl.
*G01D 18/00* (2006.01)
*G01D 21/00* (2006.01)

(52) U.S. Cl.
CPC ...................... *G01D 18/00* (2013.01)

(58) Field of Classification Search
USPC ......................................................... 73/1.16
See application file for complete search history.

(56) References Cited

U.S. PATENT DOCUMENTS

| | | | |
|---|---|---|---|
| 6,092,428 A * | 7/2000 | Brockhaus ................. | 73/861.14 |
| 6,324,482 B1 * | 11/2001 | Nakagaki et al. ............ | 702/104 |
| 6,564,637 B1 | 5/2003 | Schalk et al. | |
| 7,114,400 B2 * | 10/2006 | Florin ........................ | 73/861.12 |
| 7,756,680 B2 * | 7/2010 | Hammerschmidt .......... | 702/185 |
| 8,049,524 B2 | 11/2011 | Gehrke et al. | |
| 2003/0126932 A1 * | 7/2003 | Brockhaus ............... | 73/861.356 |
| 2011/0067506 A1 * | 3/2011 | Kimmerle et al. ........... | 73/865.8 |
| 2011/0148431 A1 | 6/2011 | Satou et al. | |

FOREIGN PATENT DOCUMENTS

| | | | | |
|---|---|---|---|---|
| DE | 102 31 180 A1 | 10/2003 | | |
| DE | 10231180 A1 * | 10/2003 | ............... | G01D 5/12 |
| DE | 10 2010 029 903 A1 | 12/2011 | | |
| GB | 2 379 022 B | 8/2003 | | |
| WO | 2008/031376 A1 | 3/2008 | | |
| WO | 2010/006897 A1 | 1/2010 | | |

* cited by examiner

*Primary Examiner* — Eric S McCall
*Assistant Examiner* — Anthony W Megna Fuentes
(74) *Attorney, Agent, or Firm* — Roberts Mlotkowski Safran & Cole, PC; David S. Safran (57) ABSTRACT

A method for testing of a measuring device arrangement (1), the measuring device arrangement (1) comprising a measuring device (2) which, based on the determination of a measured quantity, generates an output signal which can be tapped from a pick-off site (3) as a pick-off signal. A method for monitoring a measuring device arrangement is devised that constitutes an inline test that does not interrupt the measurement or the transfer of the measured values is achieved in that an action is applied to the measuring device (2) such that the measuring device (2) generates a test signal as the output signal, and that the output signal and/or a signal which is dependent on it is influenced such that the pick-off signal is a definable setting signal.

4 Claims, 5 Drawing Sheets

TESTING OF A MEASURING DEVICE ARRANGEMENT, CORRESPONDING MEASURING DEVICE ARRANGEMENT AND TEST ARRANGEMENT

BACKGROUND OF THE INVENTION

1. Field of the Invention

The invention relates to a method for testing of a measuring device arrangement which comprises at least one measuring device. The measuring device, based on the determination of at least one measured quantity, generates at least one output signal which can be tapped from a pick-off site as a pick-off signal. The invention furthermore relates to a measuring device arrangement with at least one measuring device and one pick-off site. Furthermore the invention relates to a test arrangement for testing of a measuring device arrangement.

2. Description of Related Art

In modern process automation, the safety of the control or regulation of processes and the reliability of the field devices which are used for this purpose (for example, sensors for determining and/or monitoring of measured quantities or process variables or actuators for control or regulation of processes) acquire high and increasing importance. In particular, for safety-critical applications, it is necessary for the measurement or display devices to produce the correct output signals, i.e., those which are appropriate to the monitored state and for these output signals to be correctly processed in subordinate or higher-level units.

In order to be able to obtain information about the reliability or safety of devices of process automation, function tests or tests of individual components or of entire systems are therefore carried out. One possibility is to start up different states of the system which is being monitored, and for example, also controlled by the field devices, and to evaluate the signals which have been generated by the measuring devices. Thus for example, tanks in which the levels of media are to be monitored are filled or emptied during a function test. On the one hand, this is to some extent very complex. On the other hand, it is not always possible or it must be prevented under certain circumstances that special states of the system to be monitored be present. For example, if it is critically necessary for the overfilling of a container with a dangerous substance to be recognized or prevented, this state cannot be started up in the manner of a test. Therefore, in tests the presence of states or values of the measured quantities which are associated therewith is preferably simulated by for example, corresponding signals being fed into the field devices.

International Patent Application Publication WO 2010/006897 A1 describes a method for testing of field devices and tackles the problem that the output signals produced during the function test of the measuring devices do not reflect the real measured values. Therefore, a test of the measuring devices is carried out in the time interval in which the measured quantities have fixed and known values. Preferably, this takes place at the time at which a test of the units which are subordinate to the measuring devices or of the entire system also takes place. Therefore, the time interval is used for the test in which a measurement is not necessary because it is known that the measured quantity does not change or because a genuine evaluation of the measurement signals dictated by the test of the higher-level units does not take place. The disadvantage here is that an inline measurement, therefore a measurement during process operation, is not possible since the actual measurement does not take place or is interrupted for the test.

In U.S. Pat. No. 5,481,200, the output of a field device which is connected to a two-wire current loop is monitored by the loop resistance being determined by switching of two different currents in the current loop. With this, faults of the field device or especially of the signal output will be recognized. The disadvantage here is that by switching different currents, the transmission of the current value belonging to the measured value cannot take place, i.e., the output of the actual measured value does not take place.

U.S. Patent Application Publication 2011/0148431 A1 describes how a current transformer, as part of a measuring device, for example, can be monitored. For this purpose, a test signal is sent to the input of the current transformer and the output signal is compared to a setpoint signal. The disadvantage here is that a test state which prevents functioning of the object which is to be tested is likewise induced.

SUMMARY OF THE INVENTION

Therefore, a primary object of the present invention is to devise a method for monitoring a measuring device arrangement, and in addition, to a corresponding measuring device and test arrangement, which enables inline testing without interrupting the measurement or the transfer of the measured values.

The method in accordance with the invention in which the aforementioned object is achieved is characterized, first of all and essentially, by the following steps: in one step, an action is applied to the measuring device such that the measuring device generates a test signal as an output signal. In another step, the output signal and/or a signal which is dependent on it is influenced such that a pick-off signal is a definable setting signal. In the measuring device arrangement, the measuring device, in the normal case, i.e., in the case of the absence of a test of the measuring device, based on the measurement of the measured quantity which is to be measured and/or monitored, generates a measurement signal and outputs this as an output signal, for example, via a signal output. The output signal is then tapped from a pick-off site and is transferred as a pick-off signal, for example, to a higher-level unit.

In a simple case, the measuring device outputs its output signal to a two-wire line which is connected to the measuring device and from which the output signal can be tapped again as a pick-off signal. In the method in accordance with the invention, the measuring device is triggered in a test such that the output signal is a test signal. The test signal here can be a defined signal, such as, for example, what would be the output signal when a certain, but preferably not the current value, of the measured quantity to be measured is present. In another configuration, the test signal can be the signal which the measuring device produces based on a simulated value of the measured quantity itself or derives from the measured quantity. In the first version, for example, during the testing of the measuring device, a signal as a test signal is sent directly to the signal output of the measuring device, while in the second version, a measured quantity is defined or simulated and the measuring device produces a test signal as an output signal from the simulated measured quantity. The described versions differ especially in the depth to which the measuring device is checked: either essentially only the region of the signal output or also the components which produce the output signal from the actual measured quantity.

Furthermore, in the method in accordance with the invention, for example, an action is applied to the signal path which the test signal or output signal takes such that there is an in turn definable setting signal as a pick-off signal at a pick-off site. At the pick-off site, in normal operation, a pick-off signal which results from the actual measurement signal can be tapped. In the method in accordance with the invention, however, the output signal and/or a signal which is dependent on the output signal is influenced such that the pick-off signal is a definable setting signal which is especially different from the signal at which the test signal could be tapped. In the testing of the measuring device, therefore, an intervention takes place at at least two sites: once with respect to the output signal and once with respect to the further path of the output signal. In particular, the second intervention, i.e., the action on the output signal, makes it possible to influence the linkage of the measuring device to subordinate or higher-level units, and in this way, to also determine the action of the measuring device on these units. In the method in accordance with the invention, a test signal is generated not only by acting on the measuring device, but an action is also applied such that the test signal is tapped as its signal.

In one advantageous configuration of the method in accordance with the invention, before and/or during the action on the measuring device, i.e., before and/or during the checking of the measuring device, a current value of the measured quantity is determined and a measurement signal is produced. In this configuration, before and/or even during the checking of the measuring device, the measured quantity is measured and a corresponding measurement signal is produced. In one accompanying very advantageous version, it is provided that the output signal and/or a signal which is dependent on it is influenced such that the pick-off signal is essentially identical to the measurement signal. In this configuration, an action is applied to the output signal which is the test signal or to a signal which is dependent on the output signal—if, for example, the output signal is subjected to further conversion and the converted output signal can be tapped at the pick-off site—such that the pick-off signal corresponds to the measurement signal. If the test signal differs from the actual measurement signal, in the method in accordance with the invention, according to this configuration, the measure of the difference between the test signal and the measurement signal is corrected such that the actual measurement signal can be tapped as a pick-off signal, and also for example, can be made available to a higher-level unit. Altogether, the configuration allows checking of the measuring device without this leading to an interruption of the measurement or communication of the measured values, therefore inline checking of the measuring device is possible.

In one alternative configuration, it is provided that the output signal and/or a signal dependent on it is influenced such that the pick-off signal during a definable test time interval is essentially identical to a definable constant value. In this version the pick-off signal has a definable constant value.

One configuration comprises the output signal and/or a signal which is dependent on being influenced via a control element. In one configuration, the control element is a component which is identified essentially by an electrical resistance. An example of this is an electrical resistance element. For influencing the output signal and/or a signal which is dependent on it for example, an electrical voltage on the control element is changed. Depending on the resistance value of the control element, a current arises which acts accordingly on the pick-off signal especially by the type of wiring and arrangement of the control element upstream of the pick-off site.

The aforementioned object is achieved according to another teaching of the invention in the initially named measuring device arrangement such that there is at least one control element and that the pick-off signal which can be tapped at the pick-off site is dependent on the control element. The measurement arrangement in accordance with the invention has a measuring device which, based on the determination of at least one measured quantity, generates an output signal, and has a pick-off site at which the output signal or optionally a signal which is in turn dependent on it can be tapped as a pick-off signal. For performing a test—especially according to the above described method in accordance with the invention—the measuring device preferably also has a control input via which it becomes possible to produce the test signal as the output signal. In addition, in the measuring device arrangement in accordance with the invention, upstream of or at the pick-off site, there is a control element by which the definable pick-off signal can be generated. In this connection, reference is made to what was stated above on the method in accordance with the invention which also relates to the measuring device arrangement here.

In an advantageous configuration, it is provided that the control element is a component of the measuring device and that the measuring device has a least one plug for connecting a test apparatus. In this configuration, a compact structure arises by the control element being part of the measuring device, i.e., the measuring device already has a control element. For testing of the measuring device, especially in this configuration, it is also provided that a test apparatus acts on the control element, for example, from outside the measuring device. For making contact, there is especially a corresponding (test) plug via which the test apparatus can be connected to the measuring device for the test. The plug for the test apparatus, preferably in addition to the normal connections of the measuring device which are necessary for operation of the measuring device, is made so that a test or a connection of the test apparatus has no effects on the actual making of contact with the measuring device. This plug design altogether yields the major advantage that a test of the measuring device does not constitute an interruption of the contact-making with the measuring device or an interruption of the measuring device making available a measured value.

The performance of a test of the measuring device is configured altogether for example, as follows: the test apparatus is connected via the plug of the measuring device. The other contacts made with the measuring device are not affected thereby. Then the test is started, the pick-off signal being set appropriately by the test apparatus. Then the test apparatus is again withdrawn and the measuring device continues to be in the operating state. In the measuring device, a test signal is generated as an output signal and via the control element provision is made for a definable setting signal to be tapped as the pick-off signal at the pick-off site. The pick-off site is preferably the signal output of the measuring device in this configuration. The measuring device is characterized altogether in that it produces not only an output signal, but that it is also possible by a control element which belongs to it to influence the output signal for the tapping at the pick-off site. In an abstract view, more or less two successive outputs for signals in the measuring device itself arise: one output for the output signal—this output is only internal—and one output as the pick-off site for the pick-off signal—this then a normal and conventional signal output of the measuring device, the control element being located between the two "outputs" in the measuring device.

In an alternative configuration, the measuring device has a signal output for outputting of the output signal and the control element is located downstream of the signal output as a separate component. In this configuration, the measuring device requires only one control input for acting on the output signal and the signal output. The "compensation" of the output signal takes place in this configuration via an external control element which can fundamentally be connected to any known measuring device. This configuration therefore has the advantage that the demands on the actual measuring devices and the requirements for reconfigurations of existing measuring devices remain low.

The aforementioned object is achieved according to another teaching of the invention in the initially named test arrangement for testing of a measuring device arrangement in that there are at least one test apparatus and a control element. The test apparatus is used to test the measuring device which, based on the determination of at least one measured quantity, generates an output signal which can be tapped from a pick-off site as a pick-off signal. The control element influences the output signal—therefore, the test signal—and/or a signal which is dependent on the output signal. Furthermore, the test apparatus and the control element are configured and matched to one another such that, by setting the test apparatus via the control element, the pick-off signal corresponds to a definable setting signal. The particularity of the test apparatus consists in that, not only is a test signal produced, but that also the downstream "fate" of the test signal is influenced and a definable pick-off signal is produced.

What was stated above about the method in accordance with the invention and the corresponding measuring device arrangement also applies accordingly here to the test arrangement. The test arrangement in accordance with the invention creates an environment in which a test of the measuring device is carried out without interruptions of the actual measurement process or of the transmission of measurement data occurring by the output signal not being able to be tapped directly as a pick-off signal, but by its being changed appropriately. By correcting the test signal, the effects of a test to the outside, i.e., on the region bordering the measuring device with respect to the signal, are reduced or neutralized. The test apparatus, here, has the particularity that it acts not only on the measuring device, but also the further behavior of the output signal which has been generated by the measuring device. For this purpose, the test apparatus can also be composed of several separate units or elements.

In particular, there is now a host of possibilities for embodying and developing the method in accordance with the invention, the measuring device arrangement in accordance with the invention and the test arrangement in accordance with the invention. In this regard reference is made to the following description of preferred exemplary embodiments in conjunction with the accompanying drawings.

DETAILED DESCRIPTION OF THE INVENTION

Figure 1:
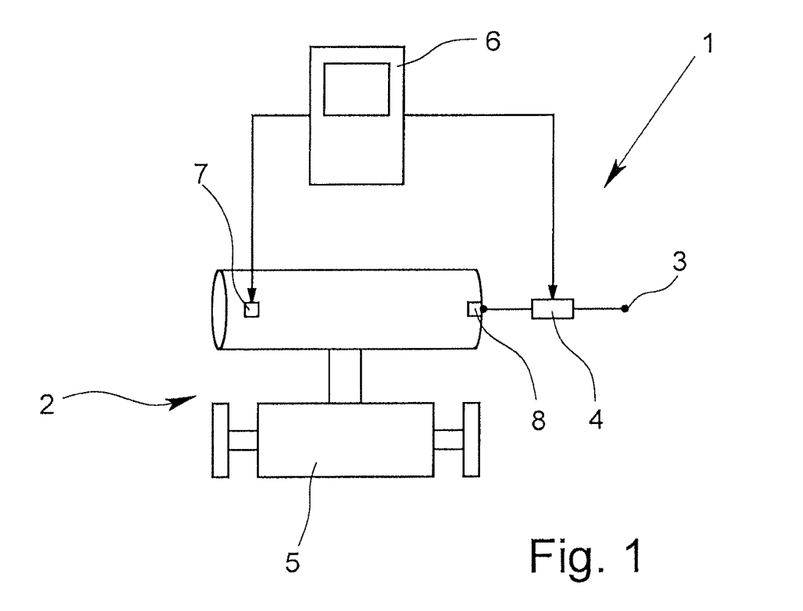
FIG. 1 is a block diagram of a measuring device arrangement in accordance with the invention according to a first version which illustrates essentially the functional active relationships.
Figure 2:
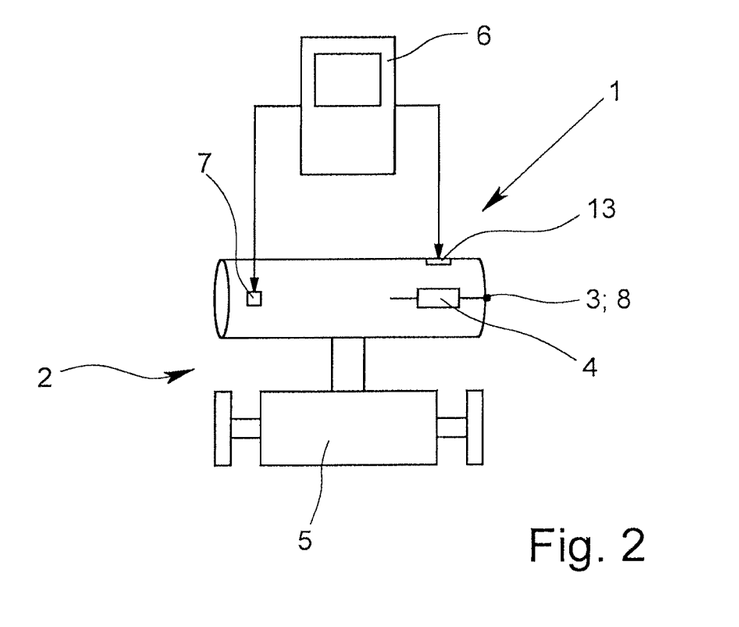
FIG. 2 is a block diagram of a measuring device arrangement in accordance with the invention according to a second version which illustrates essentially the functional active relationships, FIG. 3 schematically shows a component of a first implementation of the measuring device arrangement of FIG. 1, FIG. 4 schematically shows a component of a second implementation of the measuring device arrangement of FIG. 1, FIG. 5 schematically shows a component of a third implementation of the measuring device arrangement of FIG. 1, FIG. 6 schematically shows a part of a magnetic-inductive flow meter (MID) as a measuring device with a circuit for checking the measuring device according to a first implementation, FIG. 7 schematically shows a part of a MID as a measuring device with a circuit for checking the measuring device according to a second implementation, and FIG. 8 schematically shows a flow chart for an exemplary configuration of the steps of the method in accordance with the invention.
Figure 3:
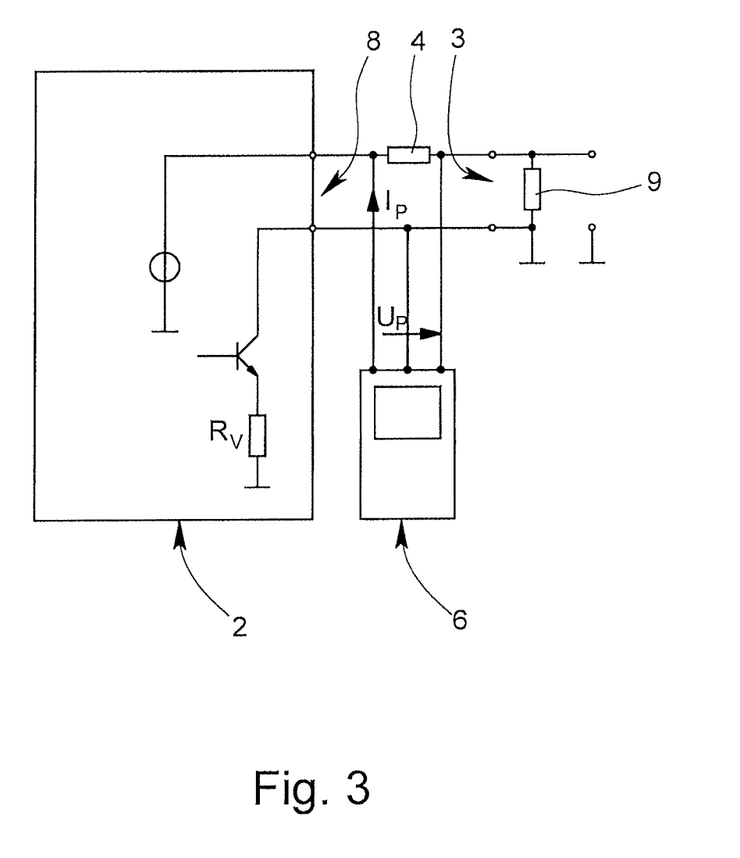
Figure 4:
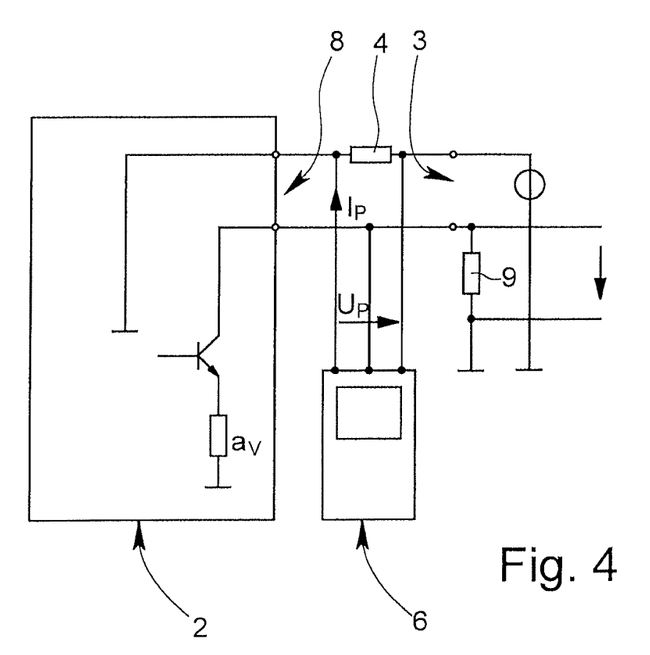
Figure 5:
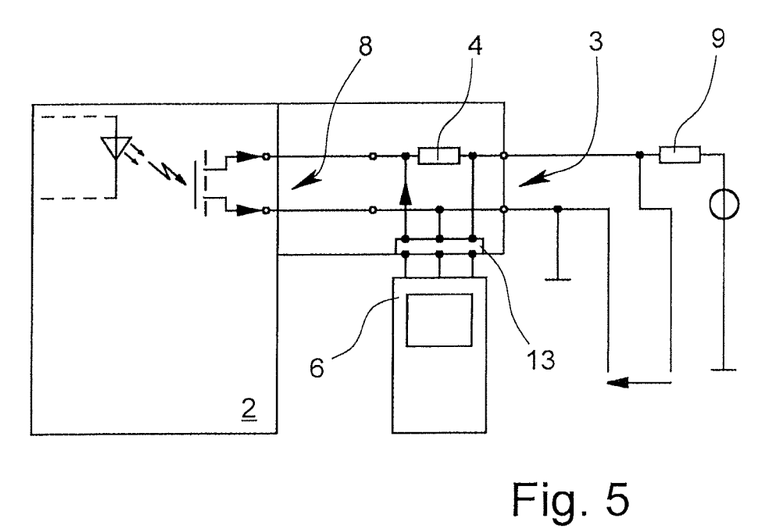
Figure 6:
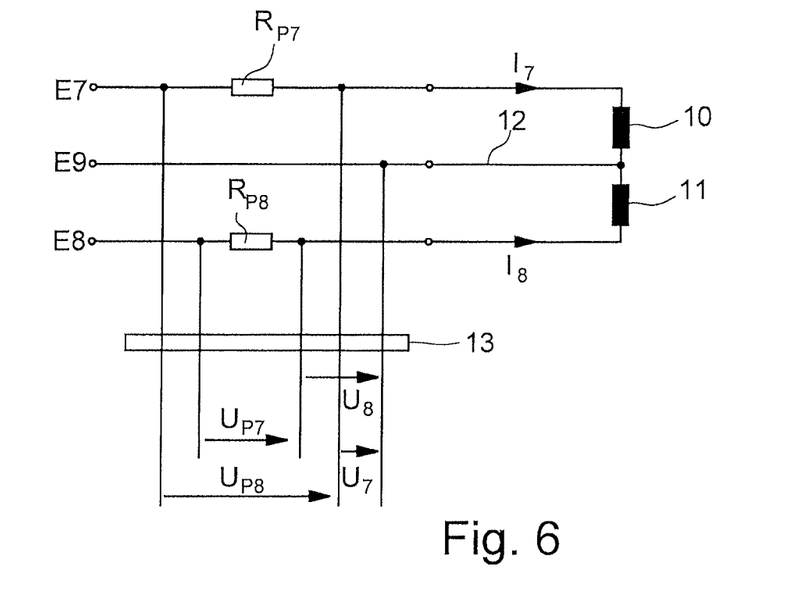
Figure 7:
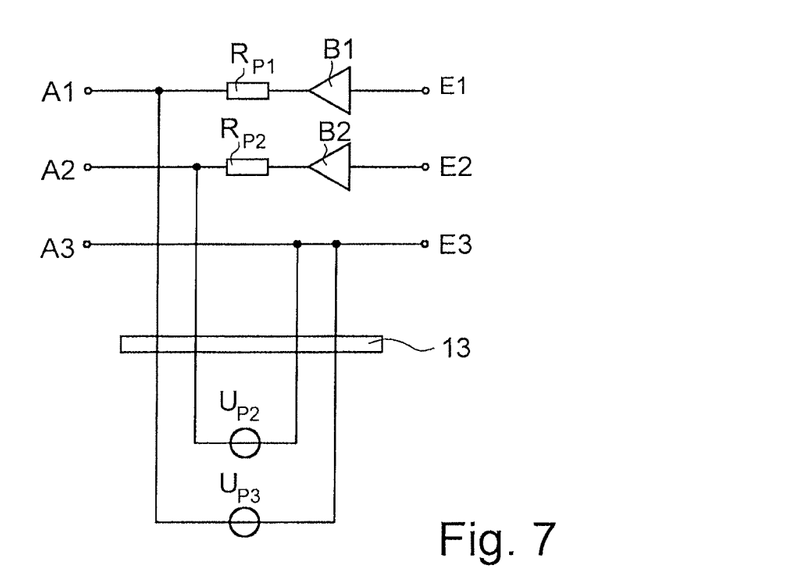

FIGS. 1 & 2 each show a different exemplary embodiment of a measuring device arrangement 1, the figures not being representations in the sense of specific electrical circuit diagrams, but rather being intended to illustrate the active relationships between the different components. The highly schematic components of possible implementations of a measuring device arrangement 1 according to FIG. 1 which are shown in FIGS. 3 to 5 are intended to fundamentally illustrate some details. The extracts from two schematic circuits for testing of parts of a MID as an example of a measuring device are shown in FIGS. 6 & 7. The behavior of an exemplary embodiment of the method in accordance with the invention for testing of a measuring device arrangement which is shown fundamentally as in FIG. 1 with a test arrangement in accordance with the invention in FIG. 8 describes basically a progression of the steps, another grouping or another succession likewise being possible and within the scope of the invention.

FIG. 1 shows in a block diagram a measuring device arrangement 1 in accordance with the invention. The measuring device 2 here is connected via a control element 4 to a pick-off site 3 and has its own sensor element 5 which is, for example, a flow meter here. The sensor element 5 generates a raw signal which is dependent on the measured quantity, here as an example, the flow rate of a medium, and from which the actual measurement signal is generated in the measuring device 2. During the test, the test apparatus 6 which is shown here purely schematically acts via the control input 7 on the measuring device 2 such that a test signal as the output signal is at the signal output 8 of the measuring device 2. The test signal can be defined for example, by the test apparatus 6 or it can be the signal which is formed by respective actions of the test apparatus 6 on different components or function blocks of the measuring device 2 to determine if they are functioning properly.

In one version, the test apparatus 6 simulates a definable value of the measured quantity and the test signal is the pertinent signal which arises by the processing of the value of the measured quantity in the measuring device 2 as a result. Preferably, the simulated value of the measured quantity differs from the real value. Depending on the type of action of the test apparatus 6 on the measuring device 2, different components or functions of the measuring device 2 can be tested. The output signal of the measuring device 2, which is made as the test signal and which can be tapped here from the signal output 8, is influenced via the control element 2 such that the definable pick-off signal arises at the pick-off site 3; in turn, in the configuration shown here, by the action of the test apparatus 6. The test apparatus 6 is shown here in FIG. 1 as one-piece, but it can also be a sectionalized arrangement of individual components which each have individual functionalities. The test apparatus 6 acts altogether on the measuring device 2 and on the signal path downstream of the signal output 8 of the measuring device 2.

The version of the measuring device arrangement 1 of FIG. 2 differs from the version of FIG. 1 in the position of the control element 4 and in the configuration of the measuring device 2. In the version of FIG. 2, the control element 4 is a component of the measuring device 2. In the configuration of FIG. 2, it also arises that the signal output 8 and the pick-off site 3 coincide. In the illustrated configuration of FIG. 2, for the double action of the test apparatus 6, it is provided that the test apparatus 6 continues to act accordingly on the control element 4 in order to produce the defined pick-off signal. This takes place for, example, via the control input 7 or—as in the example of the configuration shown here—via a separate signal input or control input of the measuring device 2 which is accessible by a plug 13 of the measuring device 2. The plug 13 especially allows the test to be performed without interrupting the actual contacts being made which are necessary for measurement operation. By way of the installed control element 4 and the connection via the plug 13, a test possibility, and in the implementation of the test steps in accordance with the invention, a test is thus implemented which does not have any effects on the measurements which can be initiated or ended without interrupting the measurement, and which also do not hinder the operation of the devices or units surrounding the measuring device 2 during the test, etc.

For the sake of clarity in FIG. 2, the same elements are provided with the same reference numbers as in FIG. 1. The test arrangement is formed in each of the configurations of FIGS. 1 & 2 by the test apparatus 6 and the control element 4, the interaction of the two allowing the implementation of the method in accordance with the invention.

FIG. 3 schematically shows a part of a measuring device 2 and the connected elements. The measuring device 2, as an example, is connected to a two-wire conductor at the signal output 8 for output of the output signals. Especially a 0 . . . 20 mA signal is produced as the output signal. This takes place here via the rheostat $R_V$ which is connected to an internal voltage source, i.e., one which belongs to the measuring device 2. In the case of testing of the measuring device 2, the test signal yields a value of the current at the signal output 8 which differs especially from the current value which is assigned to the measured value of the measured quantity.

Downstream of the signal output 8 is the control element 4 which, in the example shown here, is an electrical resistance element external to the measuring device 2. The test apparatus 6, in the case of testing, via the voltage $U_P$ which drops over the control element 4 which is made as a resistor controls the test current $I_P$ which is added to the current which prevails at the signal output 8 of the measuring device 2. By adjusting the voltage $U_P$ and the resulting test current $I_P$, the current at the signal output 8 can be corrected such that a current arises at the pick-off site 3 as is assigned to the measured value of the measured quantity. In this way, for the units following the measurement arrangement, the effect of the test signal is again compensated and the test does not lead to an interruption of measurement operation. The tapped current as the pick-off signal can then, for example, be determined via the load resistor 9 which follows the pick-off site 3 in the figure. The type of evaluation of the pick-off signal can be configured according to the versions of the prior art and depends especially on the type of signal output 8 and on the type of the output signal of the measuring device 2.

Since the test apparatus 6 influences the test signal, it allows a configuration of the test apparatus 6 or of the test arrangement (which can be considered, for example, a type of Wheatstone bridge) in order to deduce possible errors, etc. in the measuring device 2 from the measurement for the compensation of the test signal.

The control element 4 in this configuration is inserted only between the signal output 8 of the measuring device 2 and the pick-off site 3. But preferably, the attachment of the control element 4 takes place permanently and securely so that only one contact need be made by the test apparatus for the test. Therefore, the test makes unnecessary the neutralization of connections which must subsequently be closed again, but essentially only the measuring device 2 and the control element 4 must make contact.

The circuit of FIG. 4 differs from the one of FIG. 3 in that the measuring device 2 does not have its own voltage source and the signal output 8, therefore, can be used, for example, also for supplying power to the measuring device 2. The passive signal output of the configuration of FIG. 4, in contrast to the active output of the configuration of FIG. 3, also requires another type of signal evaluation on the side of the process control site. In the illustrated configuration, there is a voltage source which is constantly at 24 V in this example. The voltage which is measured over the load resistor 9 (indicated here by the two pick-offs and the arrow parallel to the load resistor 9) is then a measure for the output signal of the measuring device 2, and thus, is also a measurement for the measurement signal due to the compensation of the output signal in accordance with the invention by the test apparatus 6.

The configuration of FIG. 5 shows, for example, a measuring device 2 with a passive binary output for open collector operation. The magnitudes of the output signal are, for example, between 0 mA and 150 mA at a frequency between 1 Hz and 10 kHz. As in the configuration of FIG. 4, on the evaluation side of the process control site, this necessitates the voltage source which is shown here and which, for example, generates a voltage of 24 V.

The illustrated pick-off between the lower contact of the pick-off site 3 which is connected to ground and the upper pick-off upstream of the load resistor 9 then delivers a voltage value (again indicated by the arrow) from which the output signal of the measuring device 2 which has been corrected by the sensor element 4 or the test apparatus 6 arises as the pick-off signal. For the connection of the test apparatus 6 to the measuring device 2, there is a plug 13 here as part of the measuring device 2 via which the test apparatus 6 acts on the control element 4. The control element 4 here is also a fixed component of the measuring device 2.

FIGS. 6 & 7 schematically show details of a magnetic-inductive flow meter (MID) which is an example of a measuring device 2. In a MID, a measurement principle is implemented which is based on the separation of moving charges in a magnetic field. The measurement engineering foundation is formed by a measuring tube of a nonmagnetic material, for example, of a nonmagnetic metal which is electrically insulated from the measurement fluid on the flow side by an insulating lining, and which is penetrated by a magnetic field which has been generated by the coils of the magnetic circuit device perpendicular to the flow direction. If a measurement fluid with a minimum electrical conductivity flows through the measuring tube, the charge carriers which are present in the conductive measurement fluid undergo a deflection by the magnetic field. On measurement electrodes located perpendicular to the magnetic field and to the flow direction, a voltage is formed by the charge separation which is detected with a measuring device and which is evaluated as a measurement voltage. Since the measured voltage is proportional to the flow velocity of the charge carriers moving with the measurement fluid, the flow rate in the measuring tube can be deduced from the flow velocity.

To check a MID as a measuring device 2, FIG. 6 shows a version for testing the current which generates the magnetic field via the coils, and FIG. 7 shows a configuration for monitoring of the processing of the electrical voltage which is tapped by the electrodes. These two figures show configurations which make it possible to intervene in the measuring device 2, and thus, to test individual components of it.

FIG. 6 shows a part of a MID with a first coil 10 and a second coil 11 for generating a magnetic field and a center pick-off 12 between the coils 10, 11. Each of the coils 10, 11 have a complex resistance $R_{S1}$, $R_{S2}$. Three signal inputs E7, E8, E9 are registered, the current $I_7$ flowing between E7 and E9, i.e., via the center pick-off 12, and the current $I_8$ flowing between E9 and E8. The currents $I_7$, $I_8$ can be set appropriately during a test of the measuring device. Furthermore, there is a test resistor $R_{P7}$ between the input E7 and the first coil 10 and there is a resistor $R_{P8}$ between the input E8 and the second coil 11. Additionally, a plug 13 is schematically shown via which the corresponding voltages can be tapped. Between the resistances $R_{P7}$, $R_{P8}$, $R_{S1}$ and $R_{S2}$, the currents $I_7$, $I_8$ and the measured voltages $U_{P7}$, $U_{P8}$, $U_7$, $U_8$, there are fundamentally the following relationships:

$$I_7 = U_{P7}/R_{P7};$$

$$I_8 = U_{P8}/R_{P8};$$

$$R_{S1} = U_7/I_7;\text{ and}$$

$$R_{S2} = U_8/I_8.$$

In the configuration of FIG. 7 which schematically shows part of a circuit, there are again three inputs E1, E2, E3 and three signal outputs A1, A2, A3, the inputs E1, E2, E3 being located in the direction of the actual sensor, or here, especially in the direction of the electrodes (not shown) for tapping of the signals. Between E1 and A1 are a test resistor $R_{P1}$ and a buffer B1 upstream of the test resistor $R_{P1}$. A second test resistor $R_{P2}$ and a second buffer B2 are located between E2 and A2. Again, a plug 13 for linkage of the test apparatus is indicated. The test voltage $U_{P2}$ can be tapped at the connection between E2 and A2 and at the connection between E3 and A3. The test voltage $U_{P3}$ can be tapped at the connection between E1 and A1 and at the connection between E3 and A3. The two test voltages $U_{P2}$, $U_{P3}$ can be defined by means of the control of the electrode voltages—i.e., the voltages which can be tapped from E1, E2 and E3—during a test phase of the MID, as a result of which the electronic or evaluation components which are downstream of the electrodes—here following the outputs A1, A2 and A3—can be checked.

The buffers B1, B2 prevent interference of the electrodes in the sensor, and the resistors $R_{P1}$, $R_{P2}$ are used essentially only for protection of the buffers B1, B2.

Figure 8:
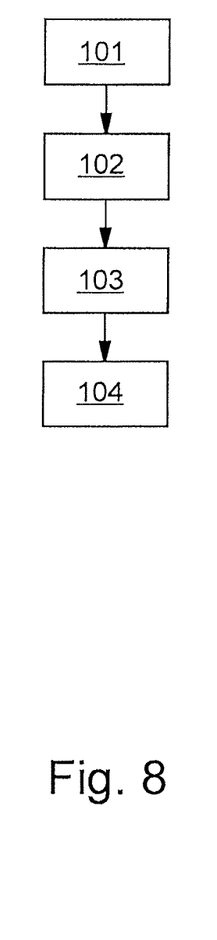

FIG. 8 schematically shows a flow chart of one configuration of the method in accordance with the invention. The method is to be applied to a measuring device arrangement as is shown by way of example in FIG. 1. In a first step 101, the measuring device determines a current value of the measured quantity and with it produces a measurement signal. During the steps of testing of the measuring device which are listed here, in step 102, the test apparatus intervenes into the measuring device and thus causes a test signal to be produced as an output signal. Here, the test signal is especially advantageously different from the measurement signal. The test signal corresponds, for example, to a maximum flow rate through the sensor element while in reality the flow rate of the measurement medium is in the normal range. In step 103, the measuring device outputs the test signal at its signal output as an output signal. In the next step 104, the test apparatus acts on the signal path downstream of the signal output of the measuring device via the control element, and thus, causes the pick-off signal which can be tapped at the pick-off site to be a definable pick-off signal which differs especially from the test signal or from the time behavior of the test signal.

In one configuration, the test signal is corrected such that the pick-off signal is essentially identical to the measurement signal. In this case, during the testing of the measuring device the correct measurement signal can still be tapped. In one configuration, for this purpose the test apparatus stores the measurement signal and corrects the output signal via the control element until it corresponds to the measurement signal.

In another configuration, the pick-off signal is essentially equal to a constant value for a time interval which corresponds essentially to the duration of the test. The evaluation of the output signal, which is configured as a test signal with reference to testing of the measuring device, takes place in one configuration, preferably likewise, via the test apparatus which optionally evaluates by what amount the output signal must be compensated until the measurement signal or the constant definable value is established as the pick-off signal. After step 104, in one configuration, the testing is ended and the result is communicated, for example, to a higher-level unit. Alternatively, the progression is repeated in order to optionally generate another test signal.

What is claimed is:

1. A method for testing of a measuring device arrangement having a measuring device measuring a parameter and having a control element, the measuring device generating an output signal as an electrical current, the measuring device, in a normal case, generating a measurement signal as the output signal based on a parameter measured, the control element connecting the measuring device to a pick-off site at which the output signal is available for outputting, the method for testing of the measuring device arrangement comprising the steps of:

causing the measuring device to generate as a test signal a test output signal which is obtainable at a test signal output, and modifying the test signal to be based on the parameter measured one of before or during the test and making the modified test signal available for outputting at the pick-off site, wherein the test signal is modified in a manner causing the modified test signal to be essentially identical to the measurement signal.

2. A method for testing of a measuring device arrangement having a measuring device measuring a parameter and having a control element, the measuring device generating an output signal as an electrical current, the measuring device, in a normal case, generating a measurement signal as the output signal based on a parameter measured, the control element connecting the measuring device to a pick-off site at which the output signal is available for outputting, the method for testing of the measuring device arrangement comprising the steps of:

causing the measuring device to generate as a test signal a test output signal which is obtainable at a test signal output, and modifying the test signal to be based on the parameter measured one of before or during the test and making the modified test signal available for outputting at the pick-off site, wherein the test signal is modified in a manner causing the modified test signal to be essentially identical to a definable constant value during a definable test time interval.

3. The method in accordance with claim 1, wherein the test signal is modified via an electrical voltage applied to the control element.

4. The method in accordance with claim 2, wherein the test signal is modified via an electrical voltage applied to the control element.

* * * * *